UNITED STATES PATENT OFFICE.

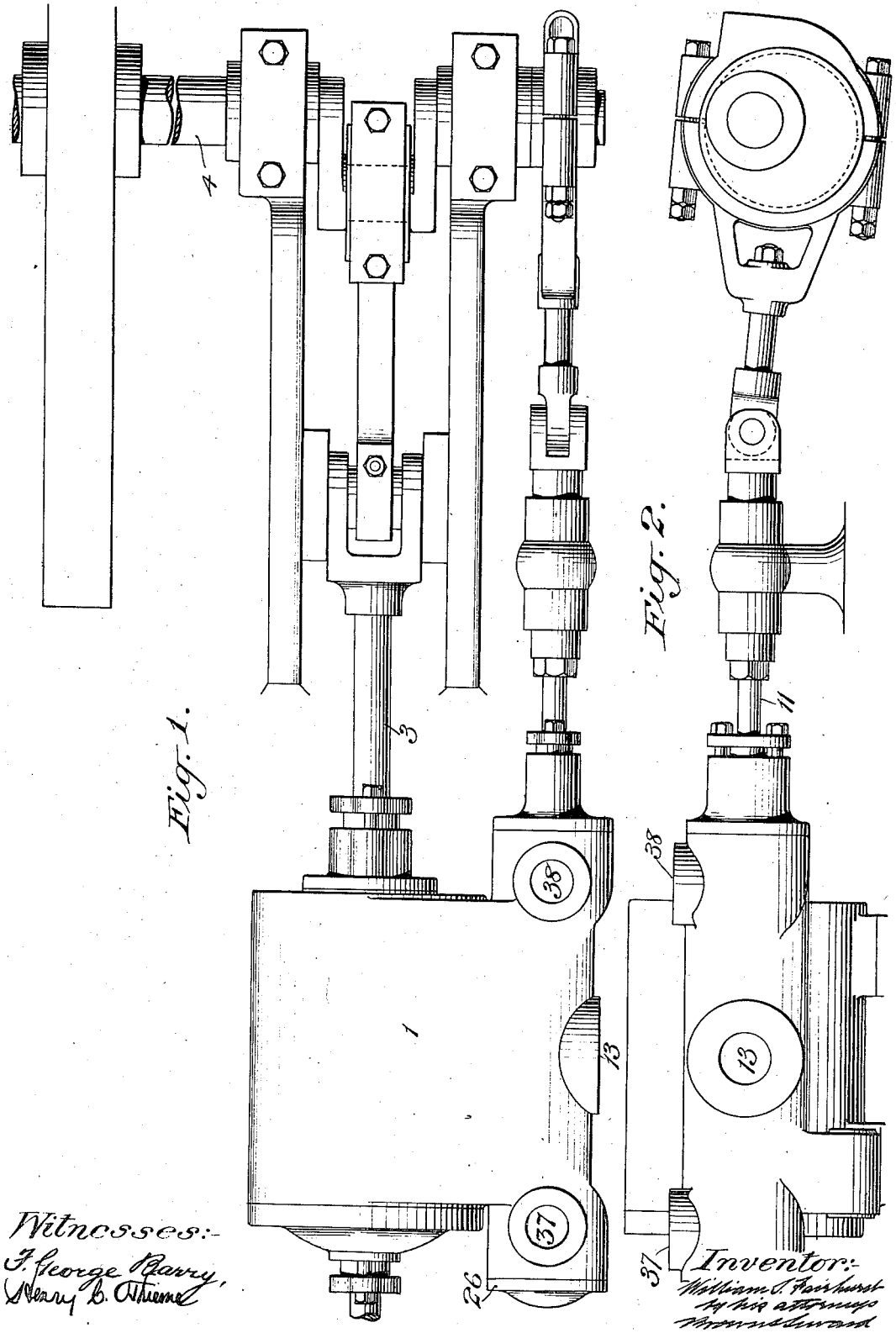

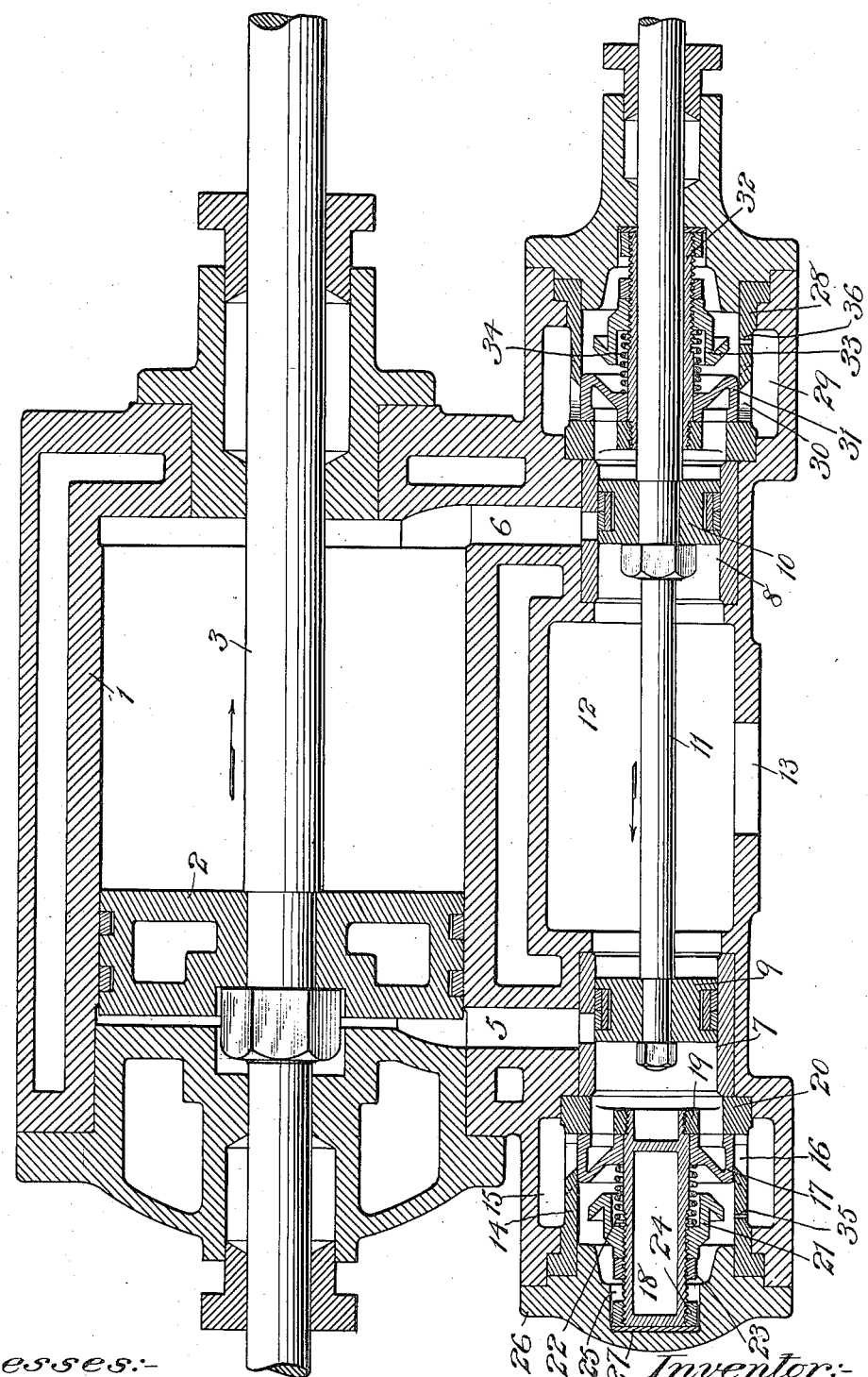

WILLIAM S. FAIRHURST, OF NEW YORK, N. Y.

VALVE MECHANISM FOR AIR-COMPRESSORS.

1,073,337.    Specification of Letters Patent.   Patented Sept. 16, 1913.

Application filed November 16, 1911. Serial No. 660,690.

*To all whom it may concern:*

Be it known that I, WILLIAM S. FAIRHURST, a citizen of the United States, and resident of the borough of Brooklyn, in the city and State of New York, have invented a new and useful Improvement in Valve Mechanism for Air-Compressors, of which the following is a specification.

My invention relates to valve mechanism for air compressors, the object being to prevent noise and hammering at whatever speed the compressor is operated.

A practical embodiment of my invention is represented in the accompanying drawings, in which, Figure 1 is a top plan view of a compressor and its valves, Fig. 2 is a view in side elevation, and Fig. 3 is a horizontal section on a larger scale.

The low pressure or main compressor cylinder is denoted by 1, its piston by 2 and the piston rod by 3. The rod 3 and hence the piston, is driven from a drive shaft 4.

At the opposite ends of the cylinder 1, ports 5 and 6 lead to piston cylinders 7 and 8, in which pistons 9 and 10 work, fixed on a piston rod 11 common to the two pistons and driven by the drive shaft 4.

The cylinders 7 and 8 are conveniently located in juxtaposition to the main cylinder 1, and the cylinder 1 is fed from an air inlet chamber 12 intermediate of the cylinders 7 and 8 and provided with an air inlet port 13.

At the outer end of the cylinder 7, there is located a valve box 14 around the wall of which is located an outlet chamber 15 into which the compressed air is forced from the cylinder 7, through a port or ports 16, opened and closed by the valve 17. The valve 17 is mounted to slide on a spindle, preferably a hollow spindle, 18, tapped into the hub 19 of a skeleton plate 20 forming the inner end of the valve box 14. The valve 17 seats against the inwardly projecting margin of the end 20 and against the inner end of the hub 19 around the spindle 18, when in position to close the port or ports 16, as shown in Fig. 3. The outer face of the valve 17 is dished cone-shape and is held normally away from the projecting cone-shape end of a nut 21 screwed on the threaded outer portion of the spindle 18, by an interposed spring 22. A lock nut 23 holds the stop nut 21 in its adjusted position to limit the throw of the valve 17 and apply the desired tension to the spring 22, and an annular nut 24 on the end of the spindle 18 fits in a socket 25 in the end cap 26 of the valve box to hold the spindle 18 against vibration.

To further deaden sound and prevent leakage, an elastic washer 27 may be inserted between the bottom of the socket 25 and the end of the spindle 18. In like manner the cylinder 8 communicates with a valve box 28 surrounded by an outlet chamber 29 which communicates with the interior of the cylinder 8, through a port or ports 30, opened and closed by a sliding valve 31 mounted on a spindle 32 and having its throw limited by a nut 33, between which and the valve a spring 34 is located, the structure and operation of the several parts being quite similar to the parts already described in relation to the cylinder 7.

The outlet chambers 15 and 29 into which the compressed air is forced are each in communication with the space back of the cut-off valve, the former through a small port 35 and the latter through a small port 36 in the wall of the valve box. The valves 17 and 31 are thus balanced and close promptly under the influence of their actuating springs the moment the piston 9 or 10 completes its compression stroke.

The ports 16 and 30 are made winding or spiral to assist in causing the valves 17 and 31 to slide smoothly. The outlet chambers 15 and 29 communicate with an intercooler or storage receptacle of any well known or approved form, not shown, through the outlet openings 37, 38, see Fig. 1.

In operation, as the piston 2 begins its stroke to the right, the piston 9 moves to the left, opening the port 5 and admitting a charge of air into the cylinder 1 through the inlet 13. At the same time, the piston 10 opens the port 6 and the air is compressed in the space between the piston 10 and valve 31 until it overcomes the pressure in 29 and opens the valve 31. The pistons 9 and 10 then move to the right, the piston 10 closing the port 6 just before the piston 2 begins to move to the left and the compressed air between the piston 10 and valve 31 is forced through valve 31 and delivered into the chamber 29, the valve 31 promptly closing under the influence of its spring 34, the moment the piston 10 stops its advance movement. The same cycle of steps takes place at the opposite end of the compressor as the piston 2 makes and completes its stroke to the left.

The valves are noiseless, they close without shock or hammering because they are cushioned on both sides and balanced by compressed air and spring, the tension of the latter and the throw of the valve being adjusted by the stop nut. These advantages of structure admit of high speed and great efficiency.

What I claim is:

1. In an air compressor, a main compressor cylinder, a piston cylinder in co-operative relation thereto, a valve box at the end of the piston cylinder, an outlet chamber in communication with the valve box, the end of the valve box adjacent to the piston cylinder being of skeleton structure and provided with annular valve seats on its inner face, a valve guiding spindle fixed in the central portion of said skeleton end, a valve mounted to slide on said spindle to open and close communication between the valve box and outlet chamber, a valve stop having a screw-threaded engagement with said spindle, a spring interposed between the valve and stop and a lock nut to hold the stop in the desired adjustment to regulate the tension of the spring.

2. In an air compressor, a main compressor cylinder, a piston cylinder in co-operative relation thereto, a valve box at the end of the piston cylinder, an outlet chamber in communication with the valve box, the end of the valve box adjacent to the piston cylinder being of skeleton structure and provided with valve seats on its inner face, a cap for the opposite end of the valve box provided with a socket in its inner face, a valve guiding spindle fixed in the said skeleton end of the valve box with its free end entering the socket in the opposite end of the valve box, a valve mounted to slide on said spindle, a spring for operating the valve and a nut having a screw-threaded engagement with the spindle within the said socket for holding the spindle against vibration.

3. In an air compressor, a main compressor cylinder, a piston cylinder in co-operative relation thereto, a valve box at the end of the piston cylinder, an outlet chamber in communication with the valve box, one end of the valve box being of skeleton structure and the opposite end provided with a cap having a socket in its inner face, a valve guiding spindle fixed in the skeleton end of the box and projecting into the socket in the opposite end, an elastic disk located between the end of the spindle and the bottom of the said socket, a nut having a screw-threaded engagement with the end of the spindle within the socket and adapted to bear against the disk to prevent leakage and hold the spindle against vibration, a valve mounted to slide on the spindle and a spring for actuating the valve.

In testimony that I claim the foregoing as my invention, I have signed my name in presence of two witnesses, this twenty-sixth day of October, 1911.

WILLIAM S. FAIRHURST.

Witnesses:
F. George Barry,
C. S. Sundgren.